(12) United States Patent
Hasegawa et al.

(10) Patent No.: US 11,387,439 B2
(45) Date of Patent: Jul. 12, 2022

(54) ANODE LAYER AND ALL SOLID STATE BATTERY

(71) Applicant: TOYOTA JIDOSHA KABUSHIKI KAISHA, Toyota (JP)

(72) Inventors: Hajime Hasegawa, Susono (JP); Hideaki Nishimura, Shizuoka-ken (JP); Shigenori Hama, Shizuoka-ken (JP); Satoshi Mizutani, Okazaki (JP); Masataka Tomita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/749,792

(22) Filed: Jan. 22, 2020

(65) Prior Publication Data

US 2021/0226194 A1    Jul. 22, 2021

(51) Int. Cl.
| | | |
|---|---|---|
| H01M 4/00 | (2006.01) |
| H01M 4/131 | (2010.01) |
| H01M 4/36 | (2006.01) |
| H01M 4/136 | (2010.01) |

(52) U.S. Cl.
CPC ......... H01M 4/131 (2013.01); H01M 4/136 (2013.01); H01M 4/366 (2013.01)

(58) Field of Classification Search
CPC .... H01M 4/136; H01M 4/485; H01M 10/052; H01M 10/0562; H01M 4/366; H10M 4/131
See application file for complete search history.

(56) References Cited

U.S. PATENT DOCUMENTS

| | | | |
|---|---|---|---|
| 2014/0193693 A1 | 7/2014 | Hoshina et al. | |
| 2014/0308583 A1* | 10/2014 | Manthiram | H01M 4/134 429/220 |
| 2018/0083284 A1* | 3/2018 | Yamashita | H02J 7/1461 |
| 2019/0006700 A1* | 1/2019 | Makino | H01M 10/056 |

OTHER PUBLICATIONS

Antonio F. Fuentes et al.; "Lithium and sodium insertion in $W_3Nb_{14}O_{44}$, a block structure type phase"; Solid State Ionics 93 (1997); pp. 245-253.
Kent J. Griffith et al.; Niobium tungsten oxides for high-rate lithium-ion energy storage; Nature (2018); vol. 559; pp. 556-563.
D. Saritha; "Electrochemical analysis of tungsten bronze-type phases, $W_9Nb_8O_{47}$ and $W_7Nb_4O_{31}$, synthesized by sol-gel method"; Materials Science & Engineering B 228 (2018); pp. 218-223.

(Continued)

*Primary Examiner* — Cynthia H Kelly
*Assistant Examiner* — Monique M Wills
(74) *Attorney, Agent, or Firm* — Dickinson Wright PLLC

(57) ABSTRACT

A main object of the present disclosure is to provide an anode layer with little resistance increase due to charge and discharge. In the present disclosure, the above object is achieved by providing an anode layer comprising: an anode active material including a Nb element, a W element, and an O element; and a solid electrolyte, and an expansion coefficient of the anode active material when charged to 200 mAh per 1 g is 1.4% or more and 5% or less.

3 Claims, 1 Drawing Sheet

(56) References Cited

OTHER PUBLICATIONS

Kazuki Ise et al.; "Large lithium storage in highly crystalline TiNb2O7 nanoparticles synthesized by a hydrothermal method as anodes for lithium-ion batteries"; Solid State Ionics 320 (2018); pp. 7-15.
Sagrario M. Montemayor et al., "Lithium insertion in two tetragonal tungsten bronze type phases, $M_8W_9O_{47}$ (M=Nb and Ta)", Journal of Materials Chemistry, vol. 8, Oct. 3, 1998, pp. 2777-2781.

* cited by examiner

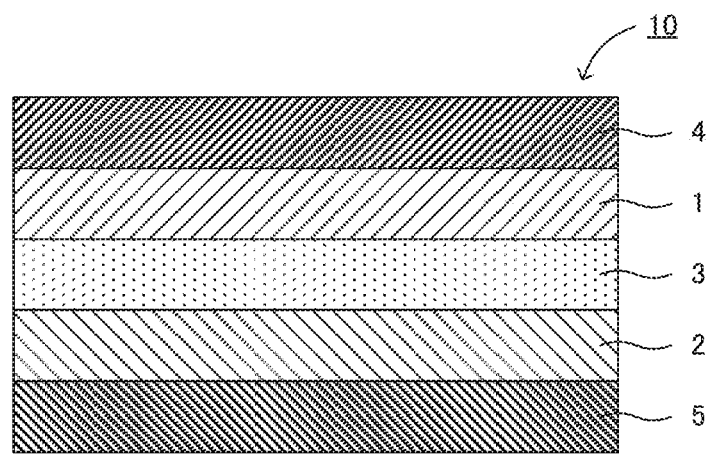

ANODE LAYER AND ALL SOLID STATE BATTERY

TECHNICAL FIELD

The present disclosure relates to an anode layer and an all solid state battery.

BACKGROUND ART

In recent years, the development of a battery has been actively carried out. For example, the development of a battery used for an electric automobile or a hybrid automobile has been advanced in the automobile industry. A battery usually comprises a cathode layer, an anode layer, and an electrolyte layer formed between the cathode layer and the anode layer. An all solid state battery comprising a solid electrolyte layer is known as one of the important batteries.

An active material (NWO) comprising a Nb element, a W element, and an O element is known as an active material to be used for a battery. For example, Non-Patent Literature 1 discloses $Nb_{16}W_5O_{55}$ and $Nb_{16}W_{16}O_{93}$. Also, Non-Patent Literature 2 discloses $W_9Nb_8O_{47}$ and $W_7Nb_4O_{31}$. Further, Non-Patent Literature 3 discloses $W_3Nb_{14}O_{44}$.

CITATION LIST

Non-Patent Literatures
Non-patent Literature 1: Kent J. Griffith et al., "Niobium tungsten oxides for high-rate lithium-ion energy storage", Nature, volume 559, 556-563 (2018)
Non-patent Literature 2: D. Saritha, "Electrochemical analysis of tungsten bronze-type phases, $W_9Nb_3O_{47}$ and $W_7Nb_4O_{31}$, synthesized by sol-gel method", Materials Science & Engineering B 228 (2018) 218-223
Non-patent Literature 3: Antonio F. Fuentes et al., "Lithium and sodium insertion in $W_3Nb_{14}O_{44}$, a block structure type phase", Solid State Ionics 93 (1997) 245-253

SUMMARY OF DISCLOSURE

Technical Problem

An anode layer with little resistance increase due to charge and discharge has been required as an anode layer. The present disclosure has been made in view of the above circumstances, and a main object thereof is to provide an anode layer with little resistance increase due to charge and discharge.

Solution to Problem

In order to solve the above problem, the present disclosure provides an anode layer comprising: an anode active material including a Nb element, a W element, and an O element; and a solid electrolyte, and an expansion coefficient of the anode active material when charged to 200 mAh per 1 g is 1.4% or more and 5% or less.

According to the present disclosure, since the expansion coefficient of the anode active material including a Nb element, a W element, and an O element is in the specific range, an anode layer with little resistance increase due to charge and discharge may be obtained.

In the disclosure, the solid electrolyte may be a sulfide solid electrolyte.

In the disclosure, a composition of the anode active material may be $Nb_{18}W_{16}O_{93}$ or $Nb_8W_9O_{47}$.

The present disclosure also provides an all solid state battery comprising a cathode layer, an anode layer, and a solid electrolyte layer formed between the cathode layer and the anode layer, and the anode layer is the above described anode layer.

According to the present disclosure, an all solid state battery with little resistance increase due to charge and discharge may be obtained by using the above described anode layer.

Advantageous Effects of Disclosure

The anode layer in the present disclosure exhibits an effect of little resistance increase due to charge and discharge.

BRIEF DESCRIPTION OF DRAWINGS

FIG. 1 is a schematic cross-sectional view illustrating an example of the all solid state battery in the present disclosure.

DESCRIPTION OF EMBODIMENTS

The anode layer and the all solid state battery in the present disclosure will be hereinafter described in detail.

A. Anode Layer

The anode layer in the present disclosure comprises an anode active material including a Nb element, a W element, and an O element; and a solid electrolyte, and an expansion coefficient of the anode active material when charged to 200 mAh per 1 g is in the specific range.

According to the present disclosure, since the expansion coefficient of the anode active material including a Nb element, a W element, and an O element is in the specific range, an anode layer with little resistance increase due to charge and discharge may be obtained. For example, in Non-Patent Literature 1, the performance of an active material is evaluated by producing a liquid based battery using $Nb_{16}W_5O_{55}$ and $Nb_{18}W_{16}O_{93}$ as active materials. Meanwhile, a flowable liquid electrolyte is used in the liquid based battery; however, a solid electrolyte having no flowability is used in an all solid state battery. Therefore, there is a problem peculiar to the all solid state battery that an ion conductive path and an electron conductive path are easily insulated when the volume variation of the active material occurs due to charge and discharge. As the result, a resistance increase is easily caused in the all solid state battery, when a cycle of charge and discharge is repeated.

In the present disclosure, in contrast to this, since the expansion coefficient of the anode active material including a Nb element, a W element, and an O element is in the specific range, an anode layer with little resistance increase due to charge and discharge may be obtained. As described in Examples later, when the expansion coefficient of the anode active material is too high, the resistance increase due to charge and discharge was also increased, as expected. Meanwhile, it was expected that the lower the expansion coefficient of the anode active material was, the better. However, it was surprisingly found out that, when the expansion coefficient of the anode active material was too low, the resistance increase due to charge and discharge was increased. As described above, since the expansion coefficient of the anode active material in the present disclosure is not too low, an anode layer with little resistance increase due to charge and discharge may be obtained.

1. Anode Active Material

The anode active material (NWO) in the present disclosure is an oxide active material including a Nb element, a W element, and an O element. Since NWO is an oxide, there is an advantage of high thermal stability. Also, NWO is relatively high in capacity, low in volume variation due to charge and discharge, and high in Li diffusion capability.

The expansion coefficient of the anode active material when charged to 200 mAh per 1 g (200 mAh/g) is in the specific range. The expansion coefficient is usually 1.4% or more. Meanwhile, the expansion coefficient is usually 5% or less. How to determine the expansion coefficient will be described in Examples later.

The composition of the anode active material is not particularly limited, and examples may include $Nb_xW_yO_z$ ($0<x$, $0<y$, $0<z$). When the valence of Nb is pentavalent and the valence of W is hexavalent, $Z=(5x+6y)/2$ is satisfied. The x and y are, for example, 1 or more and 30 or less, respectively. Examples of the composition of the anode active material may include $Nb_8W_9O_{47}$, and $Nb_{18}W_{16}O_{93}$.

The anode active material preferably has crystallinity. Examples of the crystal form of the anode active material may include monoclinic, tetragonal, and orthorhombic.

Examples of the shape of the anode active material may include a granular shape. The average particle size ($D_{50}$) of the anode active material is, for example, 0.1 μm or more, and may be 1 μm or more. Meanwhile, the average particle size ($D_{50}$) of the anode active material is, for example, 50 μm or less, and may be 30 μm or less. The average particle size ($D_{50}$) may be determined by an observation with a scanning electron microscope (SEM), for example. The number of the sample is preferably large; for example, 100 or more.

The proportion of the anode active material in the anode layer is, for example, 20 weight % or more, may be 30 weight % or more, and may be 40 weight % or more. Meanwhile, the proportion of the anode active material in the anode layer is, for example, 90 weight % or less, may be 80 weight % or less, and may be 60 weight % or less.

A method for producing the anode active material is not particularly limited. Examples of the method may include a method wherein a precursor is formed by conducting mechanical milling to a raw material mixture including a Nb oxide (such as $NbO_2$, $Nb_2O_5$) and a W oxide (such as $WO_2$, $WO_3$), and conducting a heat treatment to the precursor.

Examples of the mechanical milling may include ball milling, turbo milling, and disc milling. The mechanical milling may be a dry-type and may be a wet-type. Examples of a dispersing medium to be used in the wet-type mechanical milling may include alcohols such as ethanol. The conditions for the mechanical milling are appropriately arranged so as to obtain the desired anode active material.

The heat treatment temperature is, for example, 900° C. or more and may be 1000° C. or more. Meanwhile, the heat treatment temperature is, for example, 1400° C. or less, and may be 1300° C. or less. Also, the heat treatment time is appropriately arranged so as to obtain the desired anode active material. Examples of a heat treatment atmosphere may include an air atmosphere.

2. Solid Electrolyte

The solid electrolyte is a compound having ion conductivity. Examples of the solid electrolyte may include inorganic solid electrolytes such as a sulfide solid electrolyte, an oxide solid electrolyte, a nitride solid electrolyte, and a halide solid electrolyte.

Examples of the sulfide solid electrolyte having lithium ion conductivity may include a solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element.

The sulfide solid electrolyte may be a glass type sulfide solid electrolyte, may be a glass ceramic type sulfide solid electrolyte and may be a crystalline sulfide solid electrolyte. The glass type sulfide solid electrolyte may be obtained by amorphizing a raw material mixture. Examples of a method for amorphizing may include mechanical milling such as ball milling, and a melt-quenching method. Also, the glass ceramic type sulfide solid electrolyte may be obtained by, for example, heat treating the glass type sulfide solid electrolyte. Meanwhile, the crystalline sulfide solid electrolyte may be obtained by, for example, heat treating a raw material mixture.

The sulfide solid electrolyte is preferably provided with an ion conductor including a Li element, an A element (A is at least one kind of P, As, Sb, Si, Ge, Al and B) and a S element. Further, the ion conductor is preferably high in Li content. Also, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow a sulfide solid electrolyte to have high chemical stability. The proportion of the anion structure of an ortho composition with respect to all the anion structures in the ion conductor is, for example, 70 mol % or more and may be 90 mol % or more. The proportion of the anion structure of an ortho composition may be determined by methods such as a Raman spectroscopy, NMR, and XPS.

The sulfide solid electrolyte may contain lithium halide in addition to the ion conductor. Examples of the lithium halide may include LiF, LiCl, LiBr, and LiI; among them, LiCl, LiBr, and LiI are preferable. The proportion of LiX (X=F, I, Cl, and Br) in the sulfide solid electrolyte is, for example, 5 mol % or more and may be 15 mol % or more. Meanwhile, the proportion of LiX is, for example, 30 mol % or less and may be 25 mol % or less.

The sulfide solid electrolyte may have a crystal phase. Examples of the crystal phase may include a thio-LISICON type crystal phase, a LGPS type crystal phase and an argyrodite type crystal phase.

Examples of the oxide solid electrolyte having lithium ion conductivity may include a solid electrolyte including a Li element, a Y element (Y is at least one kind of Nb, B, Al, Si, P, Ti, Zr, Mo, W, and S) and an C element. The oxide solid electrolyte may have a crystal phase. Examples of the crystal phase may include a garnet type crystal phase, a perovskite type crystal phase, and a nasicon type crystal phase. Also, examples of the nitride solid electrolyte having lithium ion conductivity may include $Li_3N$. Examples of the halide solid electrolyte having lithium ion conductivity may include LiCl, LiBr, and LiI.

Examples of the shape of the solid electrolyte may include a granular shape. The average particle size ($D_{50}$) of the solid electrolyte is, for example, 0.1 μm or more, and may be 1 μm or more. Meanwhile, the average particle size ($D_{50}$) of the solid electrolyte is, for example, 50 μm or less, and may be 30 μm or less. The average particle size ($D_{50}$) may be determined by an observation with a scanning electron microscope (SEM), for example. The number of the sample is preferably large; for example, 100 or more. Also, the solid electrolyte preferably has high ion conductivity. The ion conductivity at 25° C. is, for example, $1 \times 10^{-5}$ S/cm or more, may be $1 \times 10^{-4}$ S/cm or more and may be $1 \times 10^{-3}$ S/cm or more.

The proportion of the solid electrolyte in the anode layer is, for example, 1 weight % or more, may be 10 weight % or more, and may be 20 weight % or more. Meanwhile, the proportion of the solid electrolyte in the anode layer is, for example, 60 weight % or less, and may be 50 weight % or less.

3. Anode Layer

The anode layer may further include at least one of a conductive material and a binder, in addition to the anode active material and the solid electrolyte. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, Examples of the binder may include rubber-based binders and fluorine-based binders.

The thickness of the anode layer is, for example, 0.1 µm or more and 1000 µm or less. The anode layer is preferably used for an all solid state battery. The all solid state battery will be described in detail in "B. All solid state battery".

A method for producing the anode layer is not particularly limited, and examples of the method may include a slurry method. In the slurry method, an anode layer is obtained by preparing a slurry including at least an anode active material, a solid electrolyte and a dispersing medium, coating the slurry on a base material, and drying thereof. Examples of the dispersing medium to be used for the slurry may include butyl butyrate, butyl acetate, dibutyl ether, and heptane. Examples of a method for coating the slurry may include a screen printing method, a gravure coating method, a die coating method, a doctor blade method, an inkjet printing method, a metal mask printing method, an electrostatic coating method, a dip coating method, a spray coating method, and a roll coating method. The base material to be coated with the slurry is not particularly limited, and examples may include an anode current collector, and a transfer sheet.

B. All Solid State Battery

FIG. 1 is a schematic cross-sectional view illustrating an example of the all solid state battery in the present disclosure. All solid state battery 10 illustrated in FIG. 1 comprises cathode layer 1, anode layer 2 and solid electrolyte layer 3 formed between cathode layer 1 and anode layer 2. All solid state battery 10 comprises cathode current collector 4 for collecting currents of cathode layer 1, and anode current collector 5 for collecting currents of anode layer 2. Incidentally, all solid state battery 10 may comprise a known outer packing, although not particularly shown in the FIGURE. In the present disclosure, anode layer 2 is the anode layer described in "A. Anode layer" above.

According to the present disclosure, an all solid state battery with little resistance increase due to charge and discharge may be obtained by using the above described anode layer.

1. Anode Layer

The anode layer is a layer including at least an anode active material. The anode layer may be in the same contents as those described in "A. Anode layer" above; thus, the descriptions herein are omitted.

2. Cathode Layer

The cathode layer is a layer including at least a cathode active material. Also, the cathode layer may include at least one of a solid electrolyte, a conductive material, and a binder, as necessary.

Examples of the cathode active material may include an oxide active material. Examples of the oxide active material to be used for a lithium ion battery may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

The proportion of the cathode active material in the cathode layer is, for example, 20 weight % or more, may be 30 weight % or more, and may be 40 weight % or more. Meanwhile, the proportion of the cathode active material is, for example, 80 weight % or less, may be 70 weight % or less, and may be 60 weight % or less.

The solid electrolyte, the conductive material and the binder may be in the same contents as those described in "1. Anode layer" above; thus, the description herein is omitted. The thickness of the cathode layer is, for example, 0.1 µm or more and 1000 µm or less.

3. Solid Electrolyte Layer

The solid electrolyte layer is a layer formed between the cathode layer and the anode layer, and is a layer including at least a solid electrolyte. Also, the solid electrolyte layer may include a binder as required. The solid electrolyte to be used for the solid electrolyte layer is not particularly limited, and a sulfide solid electrolyte is preferable. Incidentally, the sulfide solid electrolyte and the binder may be in the same contents as those described in "A. Anode layer" above; thus, the description herein is omitted. The thickness of the solid electrolyte layer is, for example, 0.1 µm or more and 1000 µm or less.

4. Other Constitutions

The all solid state battery in the present disclosure comprises at least the above described anode layer, cathode layer, and solid electrolyte layer. Further, the all solid state battery usually comprises a cathode current collector for collecting currents of the cathode layer and an anode current collector for collecting currents of the anode layer. Examples of the material for the cathode current collector may include SUS, Ni, Cr, Au, Pt, Al, Fe, Ti, and Zn. Meanwhile, examples of the material for the anode current collector may include SUS, Cu, Ni, Fe, Ti, Co, and Zn. Incidentally, the thickness and the shape of the cathode current collector and the anode current collector are preferably selected appropriately according to the use application of the battery.

Also, the all solid state battery in the present disclosure may further include a confining jig that applies a confining pressure along the thickness direction, to the cathode layer, the solid electrolyte layer and the anode layer. A known jig may be used as the confining jig. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. All Solid State Battery

The all solid state battery in the present disclosure is preferably an all solid state lithium ion battery. Also, the all solid state battery in the present disclosure may be a primary battery and may be a secondary battery; above all, preferably the secondary battery so as to be repeatedly charged and discharged, and be useful as a car-mounted battery, for example. The secondary battery includes the use of the secondary battery as a primary battery (use for the purpose of the first charge only).

Also, the all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the all solid state battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Synthesis of Anode Active Material>

As raw materials, $NbO_2$ (from Kojundo Chemical Lab. Co., Ltd.), and $WO_2$ (from Kojundo Chemical Lab. Co., Ltd.) were prepared and weighed so as the molar ratio of Nb and W to be Nb:W=18:16. The weighed raw materials were added into a pot made of zirconia together with ethanol (purity of 99.95%) and zirconia balls ($\phi$ 5 mm), and mixed by a planetary ball mill (from Fritsch Japan Co., Ltd.). The ethanol and the zirconia balls were removed from the obtained mixture, the rest was added to a crucible made of alumina, and burned by using an electric furnace under conditions of 1100° C. for 5 hours. The resultant was cooled naturally after burning, and after cooling, crushed in a mortar. The obtained crushed product was added into a pot made of zirconia together with ethanol (purity of 99.95%) and zirconia balls ($\phi$ 3 mm), and atomized by a planetary ball mill (from Fritsch Japan Co., Ltd.). Thereby, an anode active material ($Nb_{18}W_{16}O_{93}$) was obtained.

<Production of Anode>

Butyl butyrate, the obtained anode active material ($Nb_{18}W_{16}O_{93}$), a sulfide solid electrolyte ($Li_2S$—$P_2S_5$ based glass ceramic including LiI and LiBr, average particle size $D_{50}$=0.8 μm), a conductive material (a vapor-grown carbon fiber, VGCF, from Showa Denko K. K.), and a butyl butyrate solution containing a PVDF based binder (manufactured by Kureha Corp.) of 5 weight % were added to a container made of PP (polypropylene) in the weight ratio of anode active material:sulfide solid electrolyte conductive material:binder=70.0:24.5:2.7:2.8.

Next, the PP container was stirred for 30 seconds by an ultrasonic dispersion apparatus (UH-50, from SMT Corp.). Next, the PP container was agitated for 30 minutes by an agitation mixer (TTM-1, from Sibata Scientific Technology LTD.), and stirred for 30 seconds by the ultrasonic dispersion apparatus. After further agitating for 3 minutes by the agitation mixer, the obtained slurry was coated on an anode current collector (Cu foil) by a blade method using an applicator. The resultant was dried naturally, and then, was dried at 100° C. for 30 minutes on a hot plate to form an anode layer. An anode including an anode current collector and an anode layer was obtained by punching the above into a circle of 1.08 $cm^2$.

<Production of Solid Electrolyte Layer>

Heptane, a sulfide solid electrolyte ($Li_2S$—$P_2S_5$ based glass ceramic including LiI and LiBr, average particle size $D_{50}$=2.5 μm), and a heptane solution containing a butylene rubber based binder (from JSR Corp.) of 5 weight % were added to a container made of PP. Next, the PP container was stirred for 30 seconds by an ultrasonic dispersion apparatus (UH-50, from SMT Corp.). Next, the PP container was agitated for 30 minutes by an agitation mixer (TTM-1, from Sibata Scientific Technology LTD.), and stirred for 30 seconds by the ultrasonic dispersion apparatus. After further agitating for 3 minutes by the agitation mixer, the obtained slurry was coated on a base material (Al foil) by a blade method using an applicator. The resultant was dried naturally, and then, was dried at 100° C. for 30 minutes on a hot plate, and a transfer member including a base material and a solid electrode layer was obtained by punching the above into a circle of 1.08 $cm^2$.

<Production of Cathode Layer>

Using a tumbling fluidized bed granulating-coating machine (manufactured by Powrex Corp.), a cathode active material ($Li_{1.15}Ni_{1/3}Co_{1/3}Mn_{1/3}O_2$) was coated with $LiNbO_3$ in the atmospheric environment. After that, by burning thereof in the atmospheric environment, a cathode active material coated with $LiNbO_3$ was obtained.

Butyl butyrate, the cathode active material coated with $LiNbO_3$, a sulfide solid electrolyte ($Li_2S$—$P_2S_5$ based glass ceramic including LiI and LiBr, average particle size $D_{50}$=0.8 μm), a conductive material (a vapor-grown carbon fiber, VGCF, from Showa Denko K. K.), and a butyl butyrate solution containing a PVDF based binder (manufactured by Kureha Corp.) of 5 weight % were added to a container made of PP.

Next, the PP container was stirred for 30 seconds by an ultrasonic dispersion apparatus (UH-50, from SMT Corp.). Next, the PP container was agitated for 3 minutes by an agitation mixer (TTM-1, from Sibata Scientific Technology LTD.), and stirred for 30 seconds by the ultrasonic dispersion apparatus. After further agitating for 3 minutes by the agitation mixer, the obtained slurry was coated on a cathode current collector (Al foil) by a blade method using an applicator. The resultant was dried naturally, and then, was dried at 100° C. for 30 minutes on a hot plate to form a cathode layer. A cathode including a cathode current collector and a cathode layer was obtained by punching the above into a circle of 1 $cm^2$.

<Production of Evaluation Cell>

The anode layer in the anode and the solid electrolyte layer in the transfer member were placed so that they face to each other, and the product was pressed under the pressure of 6 ton/$cm^2$. Next, the base material (Al foil) was peeled off from the transfer member. The cathode layer in the cathode was faced to the solid electrolyte layer exposed from the base material, and the product was pressed under the pressure of 6 ton/$cm^2$. Next, an evaluation cell (laminated cell) was obtained by sealing the resultant with an aluminum laminate.

Example 2

An anode active material ($Nb_8W_9O_{47}$) was obtained in the same manner as in Example 1 except that the molar ratio of Nb and W was changed to Nb:W=8:9 in molar ratio, and the burning temperature was changed to 1200° C. An evaluation cell was obtained in the same manner as in Example 1 except that the obtained anode active material was used.

Comparative Example 1

An anode active material ($Nb_4W_7O_{31}$) was obtained in the same manner as in Example 1 except that the molar ratio of Nb and W was changed to Nb:W=4:7 in molar ratio, and the burning temperature was changed to 1200° C. An evaluation cell was obtained in the same manner as in Example 1 except that the obtained anode active material was used.

Comparative Example 2

An anode active material ($Nb_{16}W_5O_{55}$) was obtained in the same manner as in Example 1 except that the molar ratio of Nb and W was changed to Nb W=16:5 in molar ratio, and the burning temperature was changed to 1200° C. An evaluation cell was obtained in the same manner as in Example 1 except that the obtained anode active material was used.

Comparative Example 3

An evaluation cell was obtained in the same manner as in Example 1 except that $Li_4Ti_5O_{12}$ (from Ube Industries, Ltd.) was used as the anode active material.

Comparative Example 4

As raw materials, an anatase type $TiO_2$ (from Kojundo Chemical Lab. Co., Ltd.), and $Nb_2O_5$ (from Kojundo Chemical Lab. Co., Ltd.) were prepared and weighed so as the molar ratio of Ti and Nb was Ti:Nb=1:2 in molar ratio. The weighed raw materials were added into a pot made of zirconia together with ethanol (purity of 99.95%) and zirconia balls (φ 5 mm), and mixed by a planetary ball mill (from Fritsch Japan Co., Ltd.). The ethanol and the zirconia balls were removed from the obtained mixture, the rest was added to a crucible made of alumina, and burned by using an electric furnace under conditions of 1100° C. for 12 hours. The resultant was cooled naturally after burning, and after cooling, crushed in a mortar. The obtained crushed product was added into a pot made of zirconia together with ethanol (purity of 99.95%) and zirconia balls (φ 3 mm), and atomized by a planetary ball mill (from from Fritsch Japan Co., Ltd.). Thereby, an anode active material ($TiNb_2O_7$) was obtained. An evaluation cell was obtained in the same manner as in Example 1 except that the obtained anode active material ($TiNb_2O_7$) was used.

[Evaluation]

<Expansion Coefficient>

The expansion coefficient (expansion coefficient when charged to 200 mAh per 1 g) of the anode active materials obtained in Examples 1 and 2 and Comparative Examples 1 to 4 was determined from the following literatures or experiment.

Example 1: $Nb_{18}W_{16}O_{93}$: Non-Patent Literature 1
Example 2: $Nb_8W_9O_4$: Non-Patent Literature 2
Comparative Example 1: $Nb_4W_7O_{31}$: Non-Patent Literature 2
Comparative Example 2: $Nb_{16}W_5O_{55}$: Non-Patent Literature 2
Comparative Example 3: $Li_4Ti_5O_{12}$: experiment
Comparative Example 4: $TiNb_2O_7$: Kazuki Ise et al., "Large lithium storage in highly crystalline $TiNb_2O_7$ nanoparticles synthesized by a hydrothermal method as anodes for lithium-ion batteries", Solid State Ionics 320 (2018) 7-15

Incidentally, since Comparative Example 3 ($Li_4Ti_5O_{12}$) could not be charged to 200 mAh/g, the expansion coefficient when charged to 175 mAh/g was determined. These results are shown in Table 1.

<Resistance Increasing Ratio>

The resistance increasing ratio of the evaluation cells obtained in Examples 1 and 2 and Comparative Examples 1 to 4 was determined as follows.

1) Confine the evaluation cell (confining pressure: 1 MPa)
2) Charge and discharge at 25° C. (3.4 V-1 V, SOC 100%-0%)
3) Measure the resistance after 5 seconds (adjust to SOC 50%, and then, discharge for 5 seconds at 6.5 mA)
4) 300 cycles of charge and discharge at 60° C., 5.2 mA (SOC 90%-10%)
5) Charge and discharge at 25° C. (3.4 V-1 V, SOC 100%-0%)
6) Measure the resistance after 5 seconds (adjust to SOC 50%, and then, discharge for 5 seconds at 6.5 mA)

The resistance increasing ratio was determined by dividing the resistance value obtained in 6) by the resistance value obtained in 3). The results are shown in Table 1.

<Confining Pressure Increase>

The confining pressure increase of the evaluation cells obtained in Examples 1 and 2 and Comparative Examples 1 to 4 was determined. First, four evaluation cells were stacked and confined (confining pressure: 10 MPa). Next, the stacked cells were charged at 25° C. (3.4 V, 2.6 mAh/$cm^2$). The confining pressure variation during the charge was measured with a compact recording system (from Kyowa Dengyo Corporation), and the difference between the maximum confining pressure during the charge and the initial confining pressure was determined. The results are shown in Table 1.

TABLE 1

| | Anode active material | Expansion coefficient (%) | Resistance increasing ratio (%) | Confining pressure increase (MPa) |
|---|---|---|---|---|
| Example 1 | $Nb_{18}W_{16}O_{93}$ | 5 | 115 | 0.8 |
| Example 2 | $Nb_8W_9O_{47}$ | 1.4 | 110 | 0.6 |
| Comp. Ex. 1 | $Nb_4W_7O_{31}$ | 1.0 | 135 | 1.1 |
| Comp. Ex. 2 | $Nb_{16}W_5O_{55}$ | 7 | 300 | 1.8 |
| Comp. Ex. 3 | $Li_4Ti_5O_{12}$ | 0 | 128 | 0 |
| Comp. Ex. 4 | $TiNb_2O_7$ | 6 | 531 | 3.5 |

As shown in Table 1, the resistance increasing ratio was low in Examples 1 and 2. Particularly, comparing Example 2 and Comparative Example 1, it was confirmed that the resistance increasing ratio decreases by making the expansion coefficient moderately high. The reason therefor is presumed that, since the expansion coefficient was moderately high, the anode active material, the solid electrolyte, and the conductive material in the anode layer were well adhered closely. Meanwhile, by comparing Example 1 and Comparative Example 2, it was confirmed that the resistance increasing ratio increases when the expansion coefficient is too high. Also, in Comparative Example 3, it was confirmed that the resistance increasing ratio increases since the expansion coefficient is too low, as similar to Comparative Example 1. Also, in Comparative Example 4, it was confirmed that the resistance increasing ratio increases since the expansion coefficient is too high, as similar to Comparative Example 2. Also, for reference, the results of the confining pressure increase in Examples 1 and 2 and Comparative Examples 1 to 4 are shown in Table 1. The confining pressure increase is a comprehensive index that embraces the influences of, for example, the expansion coefficient of the active material, the isotropism and anisotropism of the expansion, and the hardness (Young's modulus) of the active material. In Examples 1 and 2 and Comparative Examples 1 and 2, a mutual relation between the resistance increasing ratio and the confining pressure increase was confirmed.

REFERENCE SIGNS LIST 1 cathode layer
2 anode layer
3 solid electrolyte layer
4 cathode current collector
5 anode current collector
10 all solid state battery

What is claimed is:

1. An anode layer comprising:
an anode active material including a Nb element, a W element, and an O element, wherein a composition of the anode active material is $Nb_{18}W_{16}O_{93}$ or $Nb_8W_9O_{47}$; and
a solid electrolyte, and
an expansion coefficient of the anode active material when charged to 200 mAh per 1 g is 1.4% or more and 5% or less.

2. The anode layer according to claim 1, wherein the solid electrolyte is a sulfide solid electrolyte.

3. An all solid state battery comprising a cathode layer, an anode layer, and a solid electrolyte layer formed between the cathode layer and the anode layer, and
the anode layer is the anode layer according to claim 1.

* * * * *

UNITED STATES PATENT AND TRADEMARK OFFICE
CERTIFICATE OF CORRECTION

| | | |
|---|---|---|
| PATENT NO. | : 11,387,439 B2 | Page 1 of 1 |
| APPLICATION NO. | : 16/749792 | |
| DATED | : July 12, 2022 | |
| INVENTOR(S) | : Hajime Hasegawa et al. | |

It is certified that error appears in the above-identified patent and that said Letters Patent is hereby corrected as shown below:

On the Title Page

Insert item (30):
--Foreign Application Priority Data
February 5, 2019 (JP) ...........................2019-018650--

Signed and Sealed this
First Day of November, 2022

Katherine Kelly Vidal
Director of the United States Patent and Trademark Office